United States Patent [19]
Danhamer

[11] Patent Number: 4,732,228
[45] Date of Patent: Mar. 22, 1988

[54] PRECISION BALANCE

[75] Inventor: Horst Danhamer, Schwerzenbach, Switzerland

[73] Assignee: Mettler Instrumente AG, Greifensee, Switzerland

[21] Appl. No.: 46,409

[22] Filed: May 4, 1987

[30] Foreign Application Priority Data

Aug. 22, 1986 [DE] Fed. Rep. of Germany ............ 3395

[51] Int. Cl.$^4$ ......................... G01G 23/14; G01G 3/08
[52] U.S. Cl. ..................................... 177/164; 177/229
[58] Field of Search ................ 177/164, 165, 229, 128

[56] References Cited

U.S. PATENT DOCUMENTS

| | | | |
|---|---|---|---|
| 3,847,238 | 11/1974 | Hall et al. | 177/255 |
| 4,043,415 | 8/1977 | Lüchinger | 177/255 |
| 4,485,881 | 12/1984 | Tramposch et al. | 177/229 X |
| 4,561,512 | 12/1985 | Tramposch | 177/229 |
| 4,606,421 | 8/1986 | Schroeder | 177/229 X |
| 4,653,599 | 3/1987 | Johnson | 177/229 X |
| 4,679,642 | 7/1987 | Brock et al. | 177/164 |

FOREIGN PATENT DOCUMENTS 2120796 12/1983 United Kingdom ............... 177/164

Primary Examiner—George H. Miller, Jr.
Attorney, Agent, or Firm—Toren, McGeady & Associates

[57] ABSTRACT

Precision balance including a weighing dish supported by a support member which is guided by means of guide arms in such a way that weighing dish performs essentially a vertical movement during weighing. The spacing between the ends of the guide arms is effected by means of a differential screw which changes the width of a slot formed in the frame of the balance. A V-shaped insert is placed in the slot. The insert has linear contact with the sides of the slot. When the portion of the frame located above the slot is being bent by the differential screw, an exactly defined bending line is ensured.

7 Claims, 3 Drawing Figures

PRECISION BALANCE

BACKGROUND OF THE INVENTION

1. Field of the Invention

The present invention relates to a precision balance which includes a weighing dish supported by a support member. The support member is guided by means of guide arms in such a way that the weighing dish performs essentially only a vertical movement during weighing. The precision balance further includes an adjusting device for adjusting the vertical spacing between the ends of two guide arms. The frame of the precision balance defines a slot whose width can be adjusted by means of the adjusting device.

2. Description of the Prior Art

In high-resolution balances, the relative parallel alignment of the guide arms is of important significance. In order to avoid weighing errors when the material to be weighed is not placed in the center of the weighing dish, it is necessary to be able to exactly adjust the vertical spacing between the ends of the guide arms.

An adjusting device for the exact adjustment of the spacing between two ends of guide arms placed one above the other is disclosed in German Offenlegungsschrift No. 26 37 539. The known device includes a first adjusting device for the coarse adjustment of the spacing between the two guide arm ends, for example, during the assembly. After the balance has been assembled, a second adjusting device is used for the final fine adjustment by minimally bending the fastening surface of one of the guide arm ends. The bending moment acting on the guide arm end is small and cannot substantially impair the weighing accuracy.

Balances of modern design tend to have a low structural height. In these types of balances, the adjustment of the spacing between the ends of the guide arms is effected by means of a single adjusting device. This adjusting device includes a slot provided in the frame of the balance underneath the support and fastening points of the ends of the guide arms. As a result, elastically bending support arms are formed above the slots. Each arm and, thus, the support surface of the guide arm end can be vertically adjusted by means of a differential screw by widening or narrowing the width of the slot.

The forces originating from the differential screw are not uniformly transmitted to the arm. Due to the bending of the arm and the resulting inclination of the axis of the threaded bore, the forces act eccentrically relative to the axis of the differential screw in the bore. Consequently, the support surface is not only moved parallel to the bottom side of the slot but is also bent or tilted transversely thereof. For securing and locking the adjustment effected by means of the differential screw, frequently another screw is provided parallel to the differential screw on the arm or on the frame, wherein the end of the other screw can be brought into contact with the frame or the arm. This other screw or fastening screw causes an additional change in the position of the support surface on the arm and, thus, a change of the bending line in the arm.

This indeterminate position of the support-due to the bending during adjustment to compensate for the case when the material to be weighed is not placed in the center of the weighing dish-results in undesirable weighing errors.

It is, therefore, the object of the present invention to overcome the disadvantages of the balances described above.

In particular, it is an object of the present invention to provide an adjusting device in the precision balance in which a clearly defined bending line can be obtained in the case of elastic bending of the arm.

SUMMARY OF THE INVENTION

In accordance with the present invention, an insert is placed in the slot defined in the frame. This insert is in linear contact with the bottom side of the slot which is essentially rigid and is also in linear contact with the top side of the slot which is part of an elastically bendable arm.

The advantages which are obtained by the present invention are to be seen essentially in the fact that the bending line is exactly defined by the position and the shape of the insert and that the arm and, thus, the guide arm ends fastened thereto can be bent only parallel to the bending line. In addition, an uncontrolled turning of the arm or arms is excluded.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
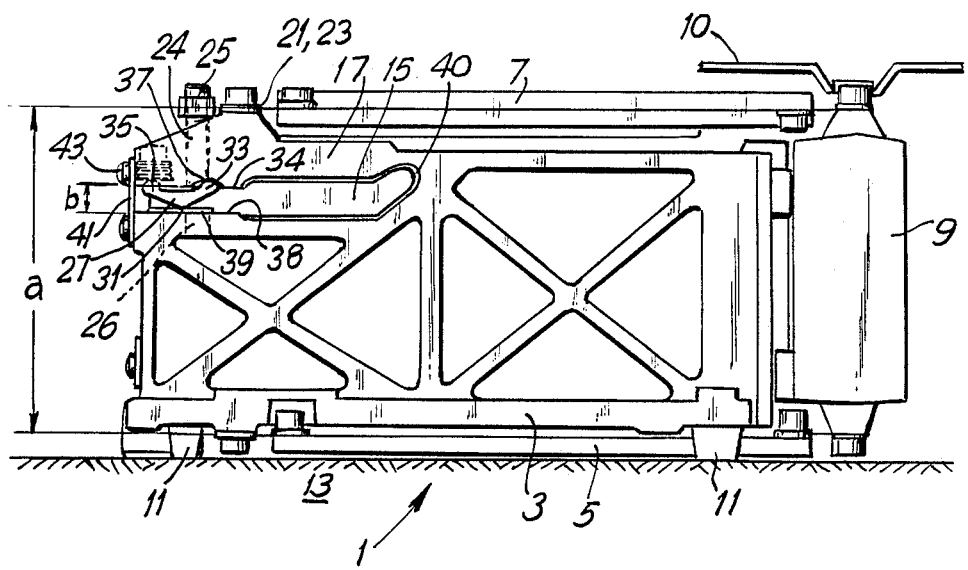
FIG. 1 is a side elevational view of a precision balance according to the invention.

As illustrated in FIG. 1, precision balance 1 according to the invention includes a frame 3, two guide arms 5 and 7, a support member 9 and a weighing dish 10. In FIG. 1, only a portion of weighing dish 10 is illustrated. Frame 3 is placed with legs 11 on a support surface 13. The two guide arms 5 and 7 which vertically guide the support member 9 are screwed to the frame 3 on the left hand side as seen in FIG. 1. Between the two upper and lower fastening points of the guide arms, frame 3 has a slot 15. The portions of frame 3 located above slot 15 are elastically bendable and, in the following, will be referred to as arm members 17.

Figure 2:
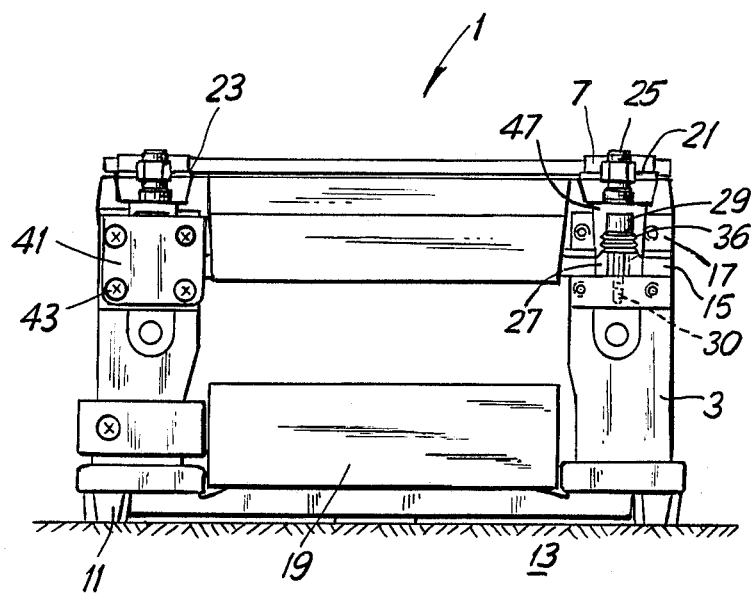
FIG. 2 is an elevational rear view of the precision balance of FIG. 1.

As can be seen in FIG. 2, frame 3 has on the opposite side of support member 9 a centrally located recess 19, so that the support surfaces of the two guide arm ends 21, 23 are placed on the two arm members 17 on both sides.

Arm members 17 have spaced apart from their free ends a threaded bore 24 each for a differential screw 25. The second threaded portion of each differential screw 25 is guided in corresponding threaded bore 26 in frame 3 underneath slot 15.

An insert 27 is placed within slots 15 underneath arm members 17. Insert 27 may be clamped between the top side 34 and the bottom side 38 of slot 15 by means of a screw 29.

Insert 27 has an essentially V-shaped cross-section. The apex 31 of insert 27 has linear contact with the bottom side 38 of slot 15, while the end of web 33 has linear contact with the top side 34 and the end of web 35 has contact with the head of screw 29. The lines of contact of the end of web 35 and of apex 31 with the respective sides of the slot are parallel.

A stack of springs 36 may be placed between screw 29 which is guided in a threaded bore 30 in frame 3 and the end of web 35. The stack of springs 36 is used for exerting an adjustable force against insert 27 which acts as a rocking member.

Figure 3:
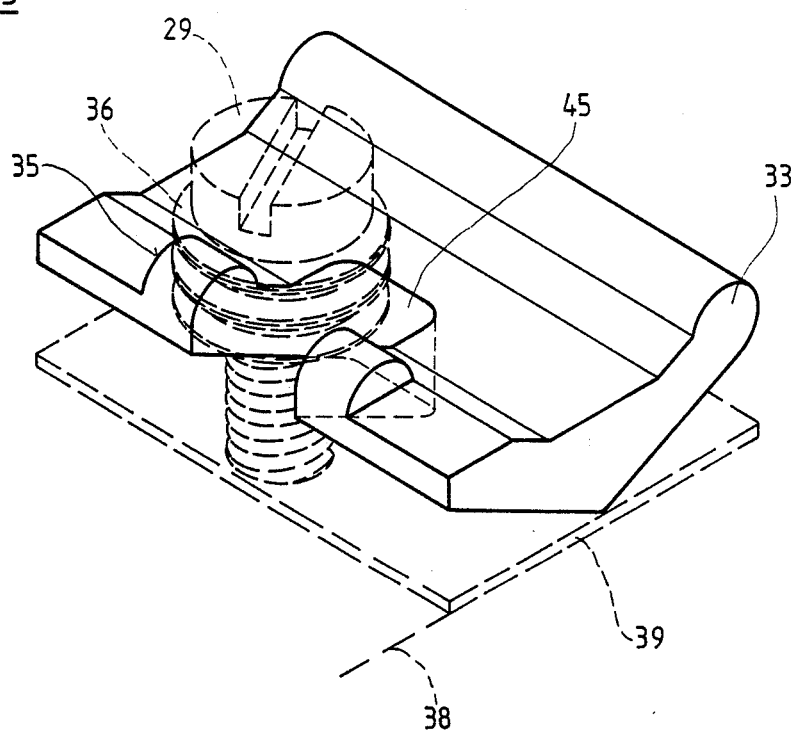
FIG. 3 is a perspective view of the insert used in the precision balance according to the invention.

The enlarged perspective view of insert 27 in FIG. 3 clearly shows that screw 29, shown in broken lines, is placed in a recess 45 formed in web 35 and, thus, serves as a lateral guidance of insert 27. Outside of the region making contact with the head of screw 29 and in the region of arm members 17, the end of web 35 is reduced in thickness, so that the end of web 35 cannot come into contact with top side 34 of slot 15. In operation of the precision balance, the lowermost spring of the stack of springs 36 presses against that portion of the end of web 35 whose thickness is not reduced.

The head of screw 29 and the stack of springs 36 are located in a recess 47 formed in the end face of each arm member 17, as can be seen on the right hand side of FIG. 2. After the precision balance 1 has been adjusted, recess 47 is covered by means of a plate 41 mounted on the end face of arm member 17.

Top side 34 of slot 15 may define a groove 37 in which the end of web 33 is guided. In addition, in the region of support of apex 31 of insert 27, a plate 39 of a hard or hardened material may be placed on the bottom side 38 of slot 15. This plate 39 forms a rigid support for apex 31.

The spacing a between the guide arm end or ends 21, 23 and the guide arm 5 is adjusted as follows:

Differential screw 25 is turned in the appropriate direction until spacing a of the two guide arm ends 21, 23 to be adjusted is exactly the same as the spacing of the other guide arm ends. During this adjustment procedure, width b of slot 15 is changed. As already explained above, the force exerted by the differential screw 25 on arm member 17 does not act along a line extending parallel to the inner end 40 of slot 15, so that arm member 17 is not being bent about an exactly definable bending line.

However, insert 27 which is placed in slot 15 and whose end of web 33 has linear contact in the groove 37 of side 34 of the bottom side of arm member 17, ensures that arm member 17 can only bend exactly parallel to the contact range which is exactly defined by insert 27. Screw 29 and the stack of springs 36 mounted thereon permit to a slight degree a rocking or tilting motion of insert 27 during the adjustment procedure. When greater adjustment distances are necessary, screw 29 is initially tightened or loosened accordingly.

After final adjustment has been carried out, plate 41 and screws 43 are used for securely screwing the end faces of arm member 17 together with those portions of frame 3 which are located underneath slot 15.

While a specific embodiment of the invention has been shown and described in detail to illustrate the application of the inventive principles, it will be understood that the invention may be embodied otherwise without departing from such principles.

I claim:

1. A precision balance, comprising a balance frame, a support member, a weighing dish attached to the support member, the support member mounted in the balance so as to perform essentially exclusively a vertical movement during weighing, guide arms attached to the support member, an adjusting device for adjusting the vertical spacing between two guide arm ends, the balance frame defining a slot such that the portion of the frame adjacent the top side of the slot forms an elastically bendable arm, while the bottom side of the slot is rigid, the width of the slot being adjustable by the adjusting device, and an insert placed in the slot, the insert having linear contact with the top side and the bottom side of the slot, wherein the lines of contact of the insert with the top side and the bottom side of the slot extend parallel.

2. The precision balance according to claim 1, comprising a differential screw for adjusting the width of the slot.

3. The precision balance according to claim 1, wherein the insert is V-shaped defining an apex and first and second webs extending from the apex, the end of the first web having contact with the top side of the slot and the apex having contact with the bottom side of the slot, and an adjusting screw screwed into the bottom side of the slot acting from the top onto the end of the second web of the insert.

4. The precision balance according to claim 3, comprising a stack of springs placed between the head of the adjusting screw and the end of the second web of the insert.

5. The precision balance according to claim 3, wherein the insert is tiltable about the apex by means of the adjusting screw 29.

6. The precision balance according to claim 3, comprising a hard or hardened plate placed on the bottom side of the slot so that the apex of the insert has contact with the plate.

7. The precision balance according to claim 3, wherein the top side of the slot defines a groove such that the end of the first web of the insert is guided in the groove.

* * * * *